(12) United States Patent
Zhang et al.

(10) Patent No.: US 11,512,946 B2
(45) Date of Patent: Nov. 29, 2022

(54) METHOD AND SYSTEM FOR AUTOMATIC FOCUSING FOR HIGH-RESOLUTION STRUCTURED LIGHT 3D IMAGING

(71) Applicant: Purdue Research Foundation, West Lafayette, IN (US)

(72) Inventors: Song Zhang, West Lafayette, IN (US); Xiaowei Hu, Beijing (CN); Guijin Wang, Beijing (CN)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/159,263

(22) Filed: Jan. 27, 2021

(65) Prior Publication Data

US 2021/0254968 A1    Aug. 19, 2021

Related U.S. Application Data

(60) Provisional application No. 62/977,519, filed on Feb. 17, 2020.

(51) Int. Cl.
| | |
|---|---|
| *G01B 11/25* | (2006.01) |
| *G02B 7/09* | (2021.01) |
| *G01B 11/00* | (2006.01) |

(52) U.S. Cl.
CPC .......... *G01B 11/254* (2013.01); *G01B 11/002* (2013.01); *G02B 7/09* (2013.01)

(58) Field of Classification Search
CPC . G01B 11/002; G01B 11/254; G01B 11/2504; G02B 7/09
USPC ........................................................ 356/603
See application file for complete search history.

(56) References Cited

U.S. PATENT DOCUMENTS

| | | | | |
|---|---|---|---|---|
| 5,675,407 | A | * | 10/1997 | Geng ...................... G06T 7/521 356/123 |
| 6,028,672 | A | * | 2/2000 | Geng ..................... G01B 11/24 250/237 G |
| 6,549,288 | B1 | * | 4/2003 | Migdal .................. G01B 11/30 356/601 |

(Continued)

OTHER PUBLICATIONS

B. Li, N. Karpinsky, and S. Zhang, "Novel calibration method for structured-light system with an out-of-focus projector," Appl. Opt. 53, 3415-3426 (2014).

(Continued)

*Primary Examiner* — Sunghee Y Gray
(74) *Attorney, Agent, or Firm* — Maginot, Moore & Beck LLP

(57) ABSTRACT

The disclosure provides an improvement to digital fringe projection techniques in which the optimal focal length settings are automatically determined for reconstructing a 3D profile. In a pre-calibration phase, geometric parameters of the system are calibrated using a few discrete focal length settings. These discretely calibrated geometric parameters are fitted onto a continuous function model. In a 3D autofocusing phase, a set of optimal focal length settings for a scene are determined using a 2D autofocusing technique. Calibrated geometric parameters for each optimal focal length setting are automatically calculated using the continuous geometric parameter model. Finally, a 3D profile of objects in the scene is reconstructed using the calibrated geometric parameters for each optimal focal length setting.

20 Claims, 4 Drawing Sheets

(56) References Cited

U.S. PATENT DOCUMENTS

| | | | |
|---|---|---|---|
| 2015/0070670 A1* | 3/2015 | Goodwin | G02B 7/365 250/206 |
| 2015/0233707 A1 | 8/2015 | Huntley et al. | |
| 2015/0305696 A1* | 10/2015 | Yamakawa | A61B 6/466 378/19 |
| 2016/0076878 A1* | 3/2016 | Tin | H04N 5/2351 348/135 |
| 2017/0085860 A1* | 3/2017 | Zhang | G06T 7/80 |
| 2020/0382760 A1* | 12/2020 | Zhang | H04N 13/254 |

OTHER PUBLICATIONS

M. Gupta and S. K. Nayar, "Micro phase shifting," in Proceedings of IEEE Conference on Computer Vision and Pattern Recognition, (IEEE, 2012), pp. 813-820.

G. Rao, L. Song, S. Zhang, X. Yang, K. Chen, and J. Xu, "Depth driven variable-frequency sinusoidal fringe pattern for accuracy improvement in fringe projection profilometry," Opt. Express 26, 19986-20008 (2018).

L. Zhang and S. Nayar, "Projection defocus analysis for scene capture and image display," ACM Transactions on Graph. 25, 907-915 (2006).

J. Sun, C. Zuo, S. Feng, S. Yu, Y. Zhang, and Q. Chen, "Improved intensity-optimized dithering technique for 3d shape measurement," Opt. Lasers Eng 66, 158-164 (2015).

Y. Wang and S. Zhang, "Three-dimensional shape measurement with binary dithered patterns," Appl. Opt. 51, 6631-6636 (2012).

S. Achar and S. G. Narasimhan, "Multi focus structured light for recovering scene shape and global illumination," in Proceedings of European Conference on Computer Vision, (Springer, 2014), pp. 205-219.

H. Kawasaki, S. Ono, Y. Horita, Y. Shiba, R. Furukawa, and S. Hiura, "Active one-shot scan for wide depth range using a light field projector based on coded aperture," in Proceedings of International Conference on Computer Vision, (IEEE, 2015), pp. 3568-3576.

Z. Zhang, "A flexible new technique for camera calibration," IEEE Transactions on Pattern Analysis Mach. Intell. 22, 1330-1334(2000).

S. Liu and H. Hua, "Extended depth-of-field microscopic imaging with a variable focus microscope objective," Opt. Express 19, 353-362 (2011).

F. O. Fahrbach, F. F. Voigt, B. Schmid, F. Helmchen, and J. Huisken, "Rapid 3d light-sheet microscopy with a tunable lens," Opt. Express 21, 21010-21026 (2013).

B. F. Grewe, F. F. Voigt, M. van't Hoff, and F. Helmchen, "Fast two-layer two-photon imaging of neuronal cell populations using an electrically tunable lens," Biomed. Opt. Express 2, 2035-2046 (2011).

C. Zuo, Q. Chen, W. Qu, and A. Asundi, "High-speed transport-ofintensity phase microscopy with an electrically tunable lens," Opt. Express 21, 24060-24075 (2013).

X. Hu, G. Wang, Y. Zhang, H. Yang, and S. Zhang, "Large depth-of field 3d shape measurement using an electrically tunable lens," Opt. Express 27, 29697-29709 (2019).

Iwai, D., Mihara, S., and Sato, K., Extended Depth-of-Field Projector by Fast Focal Sweep Projection; TVCG 462-470 (2015).

Zhang, High-Speed 3D imaging with digital fringe projection techniques (CRC University, 2016).

* cited by examiner

METHOD AND SYSTEM FOR AUTOMATIC FOCUSING FOR HIGH-RESOLUTION STRUCTURED LIGHT 3D IMAGING

This application claims the benefit of priority of U.S. provisional application Ser. No. 62/977,519, filed on Feb. 17, 2020 the disclosure of which is herein incorporated by reference in its entirety.

STATEMENT REGARDING FEDERALLY SPONSORED RESEARCH

This invention was made with government support under grant number IIS1637961 awarded by the National Science Foundation. The government has certain rights in the invention.

FIELD

The device and method disclosed in this document relates to three-dimensional imaging and, more particularly, to automatic focusing for high-resolution structured light three-dimensional imaging.

BACKGROUND

Unless otherwise indicated herein, the materials described in this section are not admitted to be the prior art by inclusion in this section.

High-resolution and high-speed three-dimensional (3D) shape measurement, or 3D "profilometry," based on various digital fringe projection (DFP) methods has been extensively studied and applied in industry, robotics, medical, and many other fields. However, it remains difficult for a non-expert to consistently acquire high-quality data using a DFP system due to the lack of automation. Additionally, existing methods require the focal plane to be fixed after system calibration, resulting in declining accuracy or limited working range when targets are not within the depth-of-field (DOF) of the system.

Various methods have been designed for extending the working range of optical 3D measurement systems, which can be mainly classified as one of two types: virtual DOF extending methods and real DOF extending methods. Virtual DOF extending methods generally increase the tolerance to lens blur. However, these methods usually cannot handle very large depth variation due to pattern information rapidly degrading when projector and camera are severely defocused. In contrast, real DOF extending methods generally increase the physical DOF by modifying the configuration of the camera or projector. However, these methods either significantly attenuate light transfer efficiency or are too complicated to be easily realized.

Automatic focusing, or "autofocusing," has been extensively used in two-dimensional (2D) imaging. However, for 2D imaging, an autofocusing method only needs to ensure that targets are in the volume of the DOF and it isn't important to accurately know the value of focal length. In contrast, in DFP based 3D profilometry, it is vital to precisely know any change of focal length to attain the highest accuracy. Thus, traditional 2D autofocusing methods cannot be directly employed in high-accuracy 3D shape measurement based on DFP techniques. Accordingly, what is needed is an autofocusing technique that can be applied to DFP based 3D profilometry to automatically adjust a focal length while also precisely knowing the value of the resulting focal length.

SUMMARY

A method for measuring a three-dimensional profile of at least one object using the digital fringe projection system including a camera and a projector is disclosed. The method comprises determining, with a processor, an optimal value for a focal length setting of the camera for capturing in-focus images of the at least one object with the camera, the camera having an electrically tunable lens. The method further comprises determining, with the processor, calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model. The method further comprises projecting, with the projector, structured light onto the at least one object to generate fringe patterns on a surface of the at least one object. The method further comprises capturing, with the camera operated with the optimal value for the focal length setting of the camera, a first image of the surface of the at least one object that includes the fringe patterns on the surface of the at least one object. The method further comprises determining, with the processor, a three-dimensional profile of the surface of the at least one object based on (i) the fringe patterns captured in the first image and (ii) the calibrated values for the plurality of geometric parameters.

A digital fringe projection system for measuring a three-dimensional profile of at least one object is disclosed. The digital fringe projection system comprises a projector configured to project structured light onto the at least one object to generate fringe patterns on a surface of the at least one object. The digital fringe projection system further comprises a camera configured to capture images of the surface of the at least one object, the camera having an electrically tunable lens. The digital fringe projection system further comprises a processor operably connected to the projector and the camera. The processor is configured to determine an optimal value for a focal length setting of the camera for capturing in-focus images of the at least one object with the camera. The processor is further configured to determine calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model. The processor is further configured to operate the projector to project structured light onto the at least one object to generate the fringe patterns on the surface of the at least one object. The processor is further configured to operate the camera, with the optimal value for the focal length setting of the camera, to capture a first image of the surface of the at least one object that includes the fringe patterns on the surface of the at least one object. The processor is further configured to determine a three-dimensional profile of the surface of the at least one object based on (i) the fringe patterns captured in the first image and (ii) the calibrated values for the plurality of geometric parameters.

A non-transitory computer-readable medium for measuring a three-dimensional profile of at least one object using the digital fringe projection system including a camera and a projector is disclosed. The computer-readable medium stores program instructions that, when executed by a processor, cause the processor to determine an optimal value for a focal length setting of the camera for capturing in-focus images of the at least one object with the camera, the camera having an electrically tunable lens. The computer-readable medium stores program instructions that, when executed by a processor, further cause the processor to determine calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model. The computer-readable medium stores program instructions that, when executed by a processor, further cause the processor to operate the projector to project structured light onto the at least one object to generate fringe patterns on a surface of the at least one object. The computer-readable medium stores program instructions that, when executed by a processor, further cause the processor to operate the camera, with the optimal value for the focal length setting of the camera, to capture a first image of the surface of the at least one object that includes the fringe patterns on the surface of the at least one object. The computer-readable medium stores program instructions that, when executed by a processor, further cause the processor to determine a three-dimensional profile of the surface of the at least one object based on (i) the fringe patterns captured in the first image and (ii) the calibrated values for the plurality of geometric parameters.

BRIEF DESCRIPTION OF THE DRAWINGS

The foregoing aspects and other features of the system and method are explained in the following description, taken in connection with the accompanying drawings.

DETAILED DESCRIPTION

Figure 1:
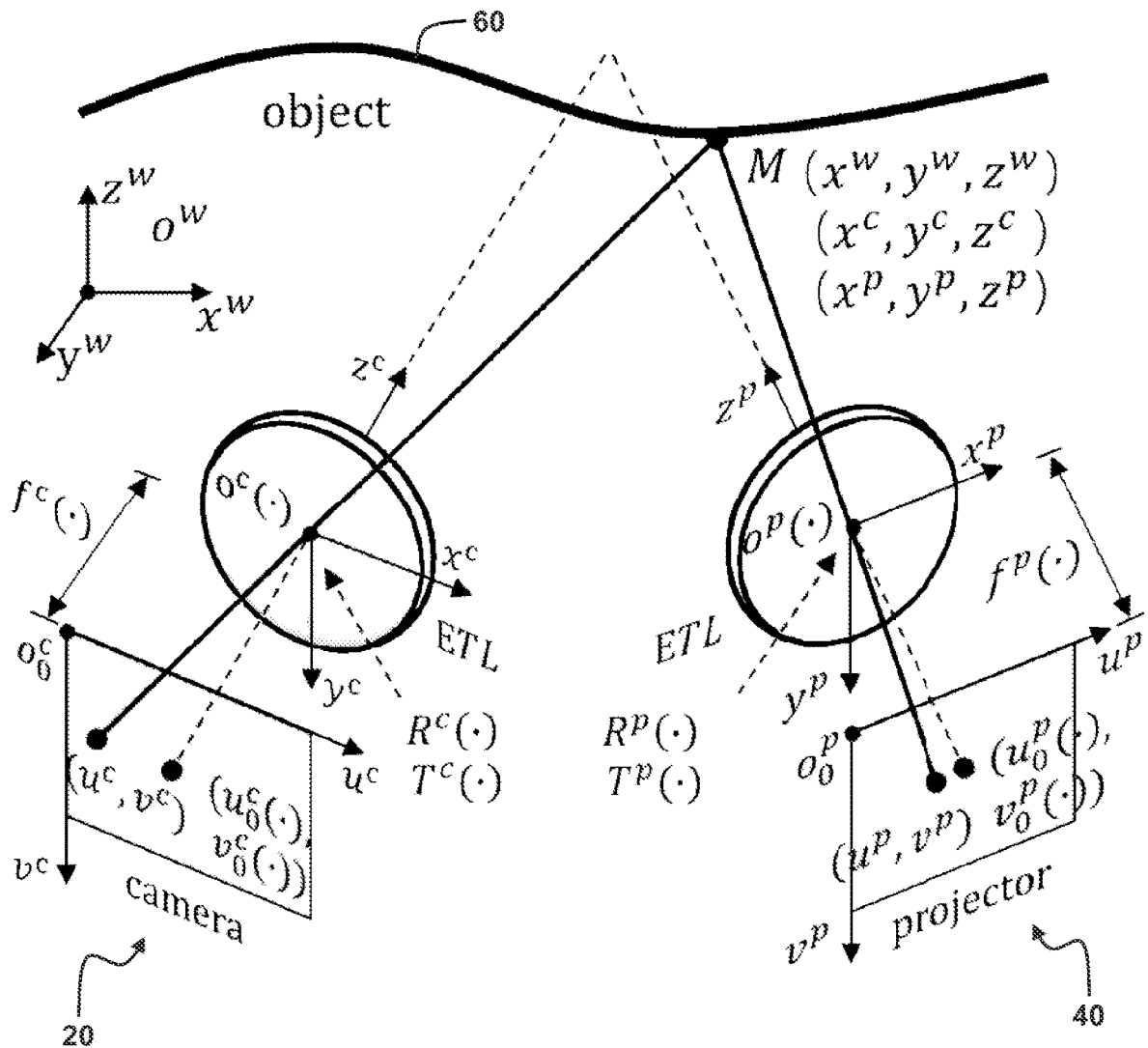
FIG. 1 shows a representative schematic diagram of a 3D autofocusing profilometry method.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Introduction to Digital Fringe Projection

The disclosure provides an improvement to digital fringe projection techniques in which the optimal focal length settings are automatically determined for reconstructing a 3D profile. It will be appreciated by those of ordinary skill in these arts that digital fringe projection (DFP), which may also be referred to as digital fringe pattern profilometry, is a non-contact profilometry technique used to measure a 3D profile of a target surface. In particular, DFP is an active technique in which a projector is utilized to project structured light onto a target object to generate fringe patterns on the surface of the target object. A camera is utilized to capture images of the fringe patterns on the surface of the target object. The structured light is periodic so as to generate essentially periodic fringe patterns on the target surface. Due to the 3D profile of the surface of the target object, the fringe patterns in the images captured by the camera are slightly shifted and/or distorted. The 3D profile of the surface of the target object can be calculated based these shifts and/or distortions in the fringe pattern. As used herein, the term "three-dimensional profile" or "3D profile" refers to any type of geometric information describing the surface to be measured and may take to form of, for example, a plurality of distance or height values, each associated with individual pixels in the images of the surface, or a plurality of points in a point cloud, each having three-dimensional coordinates in some reference coordinate system.

It will further be appreciated by those of ordinary skill in these arts that there are a wide variety of DFP techniques which utilize different forms of structured light and resulting fringe patterns. Moreover, there are also a wide variety of different algorithms for calculating the 3D profile of the surface of the target object based on images that capture the resulting fringe patterns.

The structured light can be configured so as to generate a variety of different fringe patterns including, sinusoidal fringe patterns, triangular fringe patterns, and various coded fringe patterns. Often, a fringe pattern appears as an alternating series of bars of light and dark, or as a grid of light and dark. However, other fringe patterns can be utilized. As used herein, the phrase "structured light" refers to any projected light that has predetermined structures so as to generate a pattern of light with predetermined structures on a surface. As used herein, the term "fringe pattern" refers to any pattern of light generated on a surface by structured light.

As noted above, there are also a wide variety of algorithms used to extract the 3D profile of the surface of the target object. As one particular example, we describe a three-step phase shifting algorithm for extracting geometric information from sinusoidal fringe patterns generated on a target surface. Mathematically, a $k^{th}$ sinusoidal fringe pattern can be described as:

$$I_k(x,y)=A(x,y)+B(x,y)\cos[\phi(x,y)+\delta_k] \quad (1),$$

where $A(x, y)$ is the average intensity, $B(x, y)$ is the intensity modulation, $j(x, y)$ is the phase to be solved for, and $\delta_k$ is the phase shift. The variation of fringe analysis techniques lies in the way of recovering phase $\phi(x, y)$ from the fringe pattern and subsequently reconstructing the 3D profile from $\phi(x, y)$. For example, the phase $\phi(x, y)$ can be retrieved from one single pattern using a Fourier transform method or from multiple patterns using a phase-shifting algorithm, along with other alternative methods.

In a three-step phase-shifting algorithm, the phase $\phi(x, y)$ with an equal phase shift of $2\pi/3$, i.e., $\delta_k=2\pi(k-1)/3$, can be recovered as:

$$\phi(x, y) = \tan^{-1}\left\{\frac{\sqrt{3}\,[I_1(x, y) - I_3(x, y)]}{2I_2(x, y) - I_2(x, y) - I_3(x, y)}\right\}, \quad (2)$$

where $\phi(x, y)$ is the wrapped phase with $2\pi$ discontinuities. A spatial or temporal phase unwrapping can be used to obtain a smooth phase by removing those $2\pi$ discontinuities. The unwrapped phase can then be converted to the 3D profile after system calibration.

The same set of three equations can also generate the surface texture illuminated by the average projected and ambient light:

$$T(x,y)=A(x,y)+B(x,y) \quad (3).$$

Automatic Focusing for Digital Fringe Projection

As noted above, the disclosure provides a method for 3D autofocusing profilometry (AFP) in which the optimal focal length settings are automatically determined for reconstructing a 3D profile. The 3D autofocusing profilometry method advantageously utilizes a continuous geometric parameter model which enables autofocusing in an arbitrary depth range. Additionally, the disclosed method utilizes electrically tunable lenses (ETL) for one or both of the camera and the projector.

In summary, the 3D autofocusing profilometry method includes two stages: First, a continuous geometric model is developed in a pre-calibration phase and, second, at least optimal focal length setting is detected and used to reconstruct a 3D profile in a 3D autofocusing phase. In the pre-calibration phase, a DFP system is provided with an ETL for one or both of the camera and the projector. Next, geometric parameters of the DFP system are calibrated using a few discrete focal length settings. Finally, a continuous geometric parameter model of the DFP system is created by fitting the calibration results obtained from the discrete focal length settings onto a continuous function model.

In the 3D autofocusing phase, after the pre-calibration phase is finished, a set of optimal focal length settings are determined using a 2D autofocusing technique. Next, the calibrated geometric parameters for each optimal focal length setting are automatically calculated using the continuous geometric parameter model. Finally, the 3D profile of the objects in the scene is reconstructed based on the calibrated geometric parameters for each optimal focal length setting.

FIG. 1 shows a representative schematic diagram of the 3D autofocusing profilometry method. A camera 20 and a projector 40 are both modeled by the standard pinhole model. In the schematic diagram and the description herein, a superscript $^c$ represents camera coordinates, superscript $^p$ represents projector coordinates, and superscript $^w$ represents world coordinates. One or both of the camera 20 and the projector 40 are provided with an electrically tunable lens (ETL), such that the focal length of one or both of the camera 20 and the projector 40 are continuously adjustable. Since the focal lengths are continuously adjustable, all geometric parameters are denoted by functions of the focal length by the symbol (.). The whole system can be mathematically represented by the equations:

$$s^c[u^c v^c 1]^t = A^c(.)[R^c(.),T^c(.)]X^w \quad (4),$$

$$s^p[u^p v^p 1]^t = A^p(.)[R^p(.),T^p(.)]X^w \quad (5).$$

In the equations (4) and (5), $X^w = [x^w\ y^w\ z^w\ 1]^t$ denotes the world coordinate of the point M, $(u^c,v^c)$ denotes camera coordinates corresponding to the point M, $(u^p,v^p)$ denotes projector coordinates corresponding to the point M, and $s^c$ and $S^p$ are scaling factors. $[R^c(.), T^c(.)]$ denote the camera extrinsic matrices that describe the rotation (i.e., $R^c(.)$) and translation (i.e., $T^c(.)$) from the world coordinate system to the camera coordinate system. Likewise, $[R^p(.); T^p(.)]$ denote the projector extrinsic matrices that describe the rotation (i.e., $R^p(.)$) and translation (i.e., $T^p(.)$) from the world coordinate to projector coordinate system. The rotation extrinsic matrices $R^c(.)$ and $R^p(.)$ can generally be converted to or represented as three rotation angles $[\theta_x^c(.),\theta_y^c(.),\theta_z^c(.)]$ and $[\theta_x^p(.),\theta_y^p(.),\theta_z^p(.)]$, respectively. Likewise, the translation extrinsic matrices $T^c(.)$ and $T^p(.)$ can generally be converted to or represented as three translation distances along three axes $[t_x^c(.),t_y^c(.),t_z^c(.)]$ and $[t_x^p(.),t_y^p(.),t_z^p(.)]$, respectively.

Finally, $A^c(.)$ and $A^p(.)$ denote the camera intrinsic matrix and the projector intrinsic matrix, respectively, and can be expressed according the following equations:

$$A^c(\cdot) = \begin{bmatrix} f_u^c(\cdot) & 0 & u_0^c(\cdot) \\ 0 & f_v^c(\cdot) & v_0^c(\cdot) \\ 0 & 0 & 1 \end{bmatrix}, \quad (6)$$

$$A^p(\cdot) = \begin{bmatrix} f_u^p(\cdot) & 0 & u_0^p(\cdot) \\ 0 & f_v^p(\cdot) & v_0^p(\cdot) \\ 0 & 0 & 1 \end{bmatrix}, \quad (7)$$

where $(f_u^c(.), f_v^c(.))$ describe the effective focal lengths of the camera, $(f_u^p(.), f_v^p(.))$ describe the effective focal lengths of the projector, $(u_0^c(.), v_0^c(.))$ is the camera principle point at the intersection of the optical axis $z^c$ and the imaging plane of the camera 20, and $(u_0^p(.), v_0^p(.))$ is the principle point at the intersection of the optical axis $z^p$ and the projection plane of the projector 40.

In practice, the lenses of the camera 20 and/or of the projector 40 may have nonlinear radial and tangential distortions. To resolve this, an undistorted point [u', v'] can be corrected from the distorted point [u, v] using the following equations:

$$u'=u(1+k_1(.)r^2+k_2(.)r^4)+2p_1(.)uv+p_2(.)(r^2+2u^2), \quad (8)$$

$$v'=v(1+k_1(.)r^2+k_2(.)r^4)+p_1(.)(r^2+2v^2)+2p_2(.)uv, \quad (9)$$

where $r=\sqrt{(u-u_0)^2+(v-v_0)^2}$ denotes the Euclidean distance between the distorted point [u, v] and the optical center (i.e., the principle point), $[k_1(.), k_2(.)]$ denote functions of radial distortion coefficients, and $[p_1(.), p_2(.)]$ denote functions of tangential distortion coefficients.

To simplify the mathematical representation, projection matrices P(.) are defined $P(.)=A(.)[R(.),T(.)]$ and distortion vectors D(.) are defined $D(.)=[k_1(.),k_2(.),p_1(.),p_2(.)]$. For a specified focal length setting, the camera coordinate $(u^c, v^c)$ and phase value $u^p$ (or $v^p$) for a point M are known. If the projection matrices (i.e., $P^c(.), P^p(.))$ and the distortion vectors (i.e., $D^c(.), D^p(.))$ for the current specified focal length are known, then the world coordinate $(x^w,y^w,z^w)$ of the point M can be uniquely solved. Thus, it is vital to determine the accurate correspondence relationship between the projection matrix P(.), the distortion vector D(.), and the focal length.

As noted above, one or both of the camera 20 and the projector 40 are provided with an ETL. It should be appreciated that the focal length of an ETL can be electronically changed through lens shape deformation, which can be expressed as:

$$f(\eta)=\Sigma_{k=0}^n a_k \eta^k \quad (10),$$

where $\eta$ is the control signal applied to the ETL, $f(\eta)$ is a polynomial function of $\eta$, and $a_k$ is the $k^{th}$ coefficient. Since $f(\eta)$ monotonically varies with the control signal $\eta$, all geometric parameters can be respectively modeled as the polynomial function of $\eta$ (i.e., $A^c(\eta), D^c(\eta), R^c(\eta), T^c(\eta), A^p(\eta), D^p(\eta), R^p(\eta), T^p(\eta)$). In practice, the reconstruction accuracy of the 3D profile of objects in a scene is very susceptible to the calibration. The coefficients $a_k$ of the polynomial function $f(\eta)$ are determined by fitting calibration results from a plurality of discrete focal length settings onto a polynomial function.

Once the continuous geometric parameter model of the DFP system is derived in the pre-calibration phase, it can be utilized to accurately detect the focal plane in autofocused images captured of objects in the scene, which are captured using a conventional 2D autofocusing technique. 2D autofocusing techniques and/or focal plane estimation algorithms can be divided into two types: active or passive techniques. Active autofocusing systems adopt the light-based or ultrasonic-based devices to measure the distance, which is faster because there is no need to take images, but less accurate due to distance detectors are sparse. Passive autofocusing capture a stack of images, and calculate the sharpness of each pixel using blur metrics such as entropy or variance. The focal length corresponding to the highest score is considered as the focal position of each pixel, which is more accurate than active autofocusing systems. For 3D shape measurements, isolated objects at different positions or one object with large depth variation are all needed to be accurately reconstructed.

Thus, in at least some embodiments, the 3D autofocusing profilometry method utilizes a passive autofocusing technique for capturing autofocused images of objects in the scene. In one embodiment, a contrast autofocusing method is utilized in which the magnitude of the image gradient is taken as the contrast/sharpness metric, which is defined as:

$$G_i(u, v) = |\nabla I_i(u, v)| = \sqrt{\left(\frac{\partial I_i}{\partial u}\right)^2 + \left(\frac{\partial I_i}{\partial v}\right)^2}, \quad (11)$$

where $I_i$ is the $i^{th}$ image of the image stack, and $G_i$ the gradient of $I_i$.

Moreover, the focal position of each pixel can be determined by $$\eta^*(u, v) = \eta(i) = \underset{i}{\mathrm{argmax}} G_i(u, v), \quad (12)$$

where $\eta(i)$ is the focal length corresponding to the image $I_i$, and $\eta^*$ is the pixel-wise focal position map.

Finally, an image segmentation on $\eta^*$ based on connected component analysis is performed, which outputs individual focal length settings for different targets. A coarse-to-fine focal length setting search strategy is also adopted for time-saving in the focal plane detection stage.

The whole procedure of focal length settings detection and 3D profile measurement can be summarized as following. First, the projection by the projector 40 is stopped, and a focal position map $\eta_c^*$ for the camera 20 is estimated using the 2D autofocusing technique. Next, for each individual focal length settings $f^c(\eta)$ of the focal position map $\eta_c^*$, the corresponding most in-focus focal length setting $f^p(\eta)$ of the projector is determined. Finally, the 3D profile measurement is performed for each pair of focal length settings $f^c(\eta)$ and $f^p(\eta)$. If the measurement conditions change, then the process is repeated.

Digital Fringe Projection Measurement System

Figure 2:
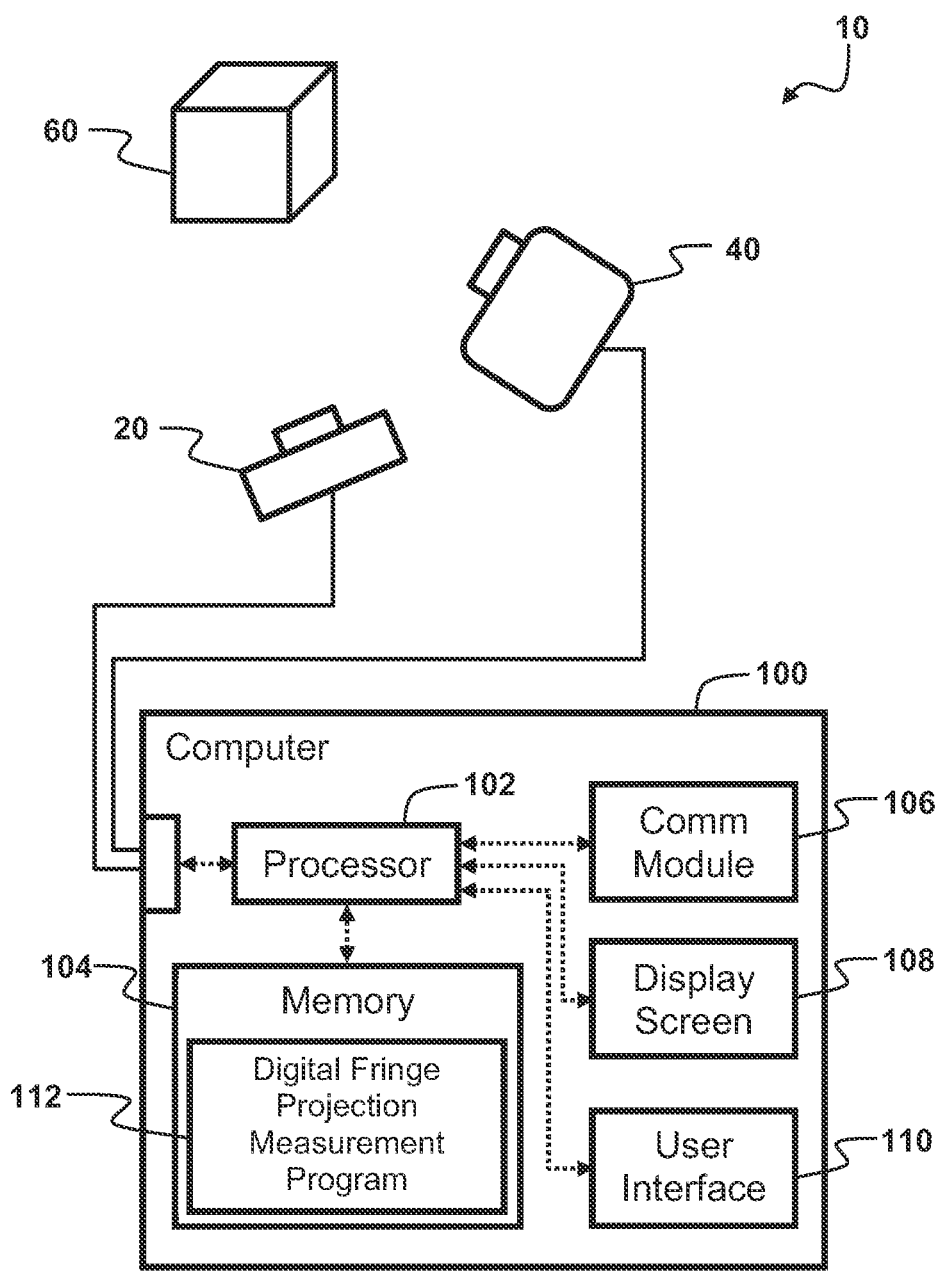
FIG. 2 shows a block diagram of an exemplary embodiment of a digital fringe projection system.

FIG. 2 shows a block diagram of an exemplary embodiment of a digital fringe projection (DFP) system 10. The DFP system 10 comprises a camera 20, a projector 40, and a computer 100. The computer 100 operates the camera 20 and the projector 40 to capture a three-dimensional image of one or more target objects 60. The computer 100 is advantageously configured to automatically detect optimal focal length settings for the target objects 60 and perform digital fringe projection based reconstruction of the 3D profile of the target objects 60 using the detected optimal focal length settings and a pre-calibrated continuous geometric parameter model. In this way, the enables autofocusing in an arbitrary depth range the DFP system 10

The camera 20 generally comprises an image sensor (not shown) configured to capture images of the target object 60. Moreover, the camera 20 generally comprises a lens (not shown), which may or may not be adjustable. In one embodiment, the camera 20 is a complementary metal-oxide-semiconductor (CMOS) camera, e.g., a PointGrey Grasshopper3 GS3-U3-23S6M, having an ETL, which consists of (i) a 16 mm focal length lens, e.g., Computar M1614-MP2 and (ii) a liquid lens, e.g., Optotune EL-16-40-TC. Additionally, the camera 20 includes a high-precision electrical lens driver, e.g., Optotune Lens driver 4i, with a resolution of, for example, 0.1 mA, which is configured to control the liquid lens. The raw images each comprise a two-dimensional array of pixels (e.g., 512×512 pixels). Each pixel (x, y) has corresponding photometric information, which at least includes an intensity I(x, y), but which may further include multi-channel intensity and/or color information. In one embodiment, an aperture of the camera 20 is set to, for example, $f/8$ for calibration and $f/2$ for reconstruction.

The projector 40 is configured to projected structured light onto the target object 60 to generate fringe patterns on the surface of the target object 60. The projector 40 generally is in the form of a digital light processing (DLP) projector, e.g., LightCrafter 4500, but may take other forms. As described above, the structured light can be configured so as to generate a variety of different fringe patterns including, sinusoidal fringe patterns, triangular fringe patterns, and various coded fringe patterns. The projector 40 projects the structured light with a particular resolution (e.g., 912×1140 pixels) and a particular frequency (e.g. 60 Hz), both of which may or may not be adjustable.

In the illustrated exemplary embodiment, the computer 100 comprises at least one processor 102, at least one memory 104, a communication module 106, a display screen 108, and a user interface 110. However, it will be appreciated that the components of the computer 100 shown and described are merely exemplary and that the computer 100 may comprise any alternative configuration. Particularly, the computer 100 may comprise any computing device such as a desktop computer, a laptop, a smart phone, a tablet, or another personal electronic device. Thus, the computer 100 may comprise any hardware components conventionally included in such computing devices.

The memory 104 is configured to store data and program instructions that, when executed by the at least one processor 102, enable the computer 100 to perform various operations described herein. The memory 104 may be of any type of device capable of storing information accessible by the at least one processor 102, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the at least one processor 102 may include a central processing unit, graphics processing units, multiple processing units, dedicated circuitry for achieving functionality, programmable logic, or other processing systems. Additionally, it will be appreciated that, although the computer 100 is illustrated as single device, the computer 100 may comprise several distinct processing systems 40 that work in concert to achieve the functionality described herein.

The communication module 106 may comprise one or more transceivers, modems, processors, memories, oscillators, antennas, or other hardware conventionally included in a communications module to enable communications with various other devices. In at least some embodiments, the communication module 106 includes a Wi-Fi module configured to enable communication with a Wi-Fi network and/or Wi-Fi router (not shown). In further embodiments, the communications modules 106 may further include a Bluetooth® module, an Ethernet adapter and communications devices configured to communicate with wireless telephony networks.

The display screen 108 may comprise any of various known types of displays, such as LCD or OLED screens. In some embodiments, the display screen 108 may comprise a touch screen configured to receive touch inputs from a user. The user interface 110 may suitably include a variety of devices configured to enable local operation of the computer 100 by a user, such as a mouse, trackpad, or other pointing device, a keyboard or other keypad, speakers, and a microphone, as will be recognized by those of ordinary skill in the art. Alternatively, in some embodiments, a user may operate the computer 100 remotely from another computing device which is in communication therewith via the communication module 106 and has an analogous user interface.

The program instructions stored on the memory 104 include a digital fringe projection measurement program 112. As discussed in further detail below, the processor 102 is configured to execute the digital fringe projection measurement program 112 to operate the camera 20 to, in the pre-calibration phase, generate a continuous geometric parameter model for the DFP system 10 and, in the 3D autofocusing phase, automatically determine at least one optimal focal length settings of each object 60 in the scene and reconstruct the 3D profile of the objects using DFP and the continuous geometric parameter model.

Method for Operating the Digital Fringe Projection Measurement System

Figure 3:
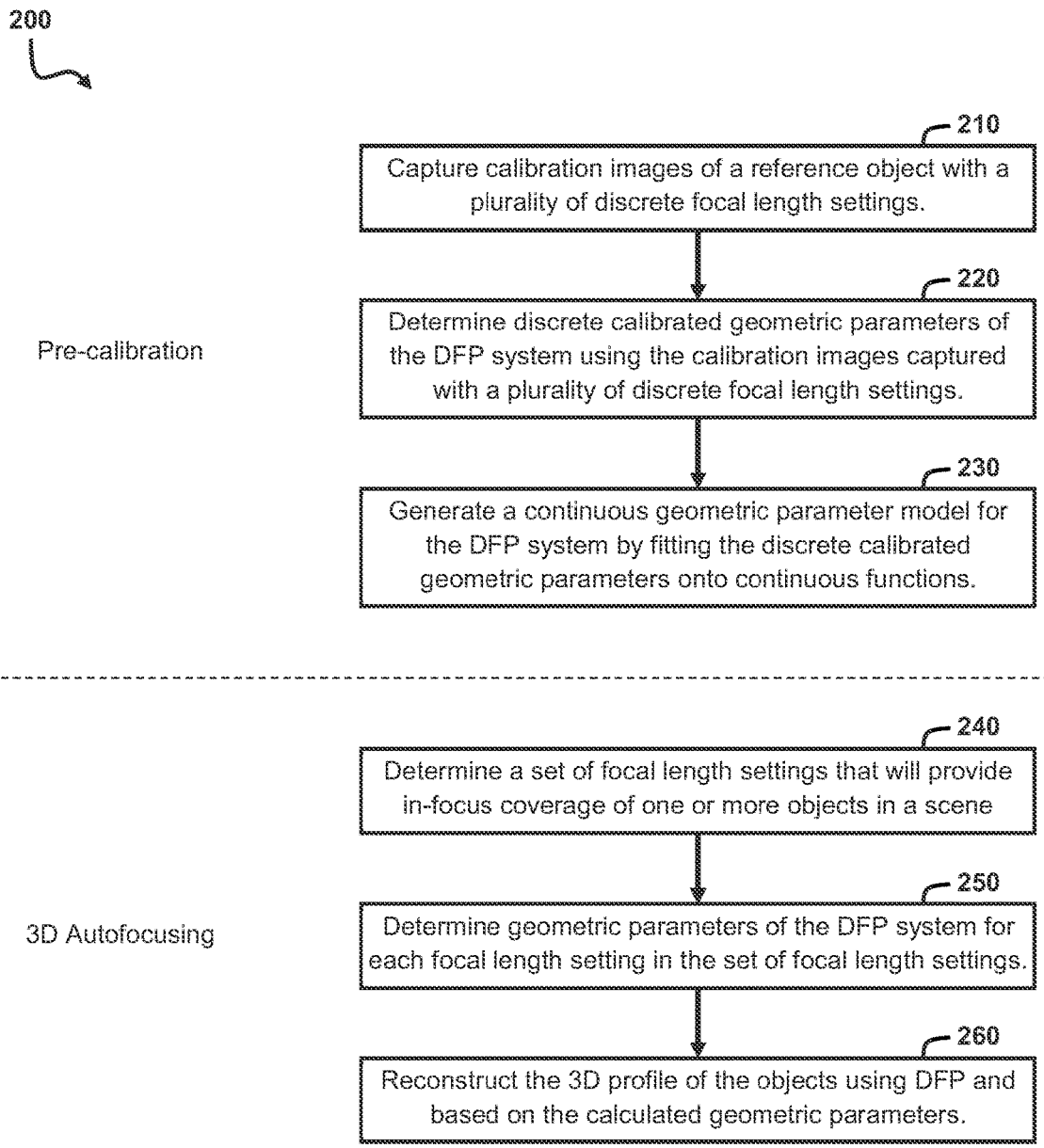
FIG. 3 shows a flow diagram for a method for operating the digital fringe projection measurement system.

FIG. 3 shows a flow diagram for a method 200 for operating the digital fringe projection system 10. In the description of the method, statements that some task, calculation, or function is performed refers to a processor (e.g., the processor 102 of the computer 100) executing programmed instructions stored in non-transitory computer readable storage media (e.g., the memory 104 of the computer 100) operatively connected to the processor to manipulate data or to operate one or more components of the computer 100 to perform the task or function. Additionally, the steps of the methods may be performed in any feasible chronological order, regardless of the order shown in the figures or the order in which the steps are described.

In the pre-calibration phase, the method 200 begins with capturing calibration images of a reference object with a plurality of discrete focal length settings (block 210). Particularly, the processor 102 operates at least one camera to capture a plurality of calibration images with a plurality of discrete focal length settings for the DFP system 10, i.e. with a plurality of discrete focal lengths $f_i$ or, in other words, with a plurality of discrete control signal values $\eta_i$, where i is an index of the respective focal length setting. In one embodiment, an aperture of the least one camera is set to a first aperture setting (e.g., $f$/8) during the pre-calibration phase, which is different than a second aperture setting used in the 3D autofocusing phase.

For the purpose of calibrating the camera 20, the processor 102 operates the camera 20 to capture a plurality of sets of calibration images of a reference object, such as a reference board, with a plurality of discrete focal lengths $f_i^c$ or, in other words, with a plurality of discrete control signal values $\eta_i^c$ for the ETL of the camera 20 (e.g., for ETL currents $\eta_i^c$ ranging from −30 mA to 30 mA, with increments of 2 mA). Each respective set of calibration images of the reference object is captured with the reference of object in a different pose (e.g., 12 different poses of the reference object). Accordingly, after each set of calibration images of the reference object is captured, the reference object is moved to a different pose by a human technician or automatically using suitable actuators configured to manipulate the pose of the reference object. In this way, a large number of calibration images are captured, which include a respective image at each discrete focal length setting $f_i^c$ and/or $\eta_i^c$ for each pose of the reference object. The processor 102 writes the calibration images for calibrating the camera 20 to the memory 104 for storage thereat.

Similarly, for the purpose of calibrating the projector 40, the processor 102 operates a camera to capture a plurality of calibration images of a reference object, such as a reference board, with a plurality of different poses. In one embodiment, the camera 20 is operated to capture these calibration images for calibration of the projector 40. However, in some cases, the field of view (FOV) of the ETL of the camera 20 may be incapable of covering the FOV of the projector. In such cases, an auxiliary camera (not shown) having a lens with a short focal length is utilized to capture these calibration images for calibrating the projector 40.

In the case that the projector 40 is provided with an ETL, the processor 102 operates the camera to capture a plurality of sets of calibration images of the reference object, which includes a respective image at each of a plurality of discrete focal lengths $f_i^p$ and/or discrete control signal values $\eta_i^p$ for each pose of the reference object, as similarly discussed above with respect the calibration images for calibrating the camera 20. However, in the case that the projector 40 is simply provided with a fixed lens, then the processor 102 operates the camera to simply capture a calibration image for each pose of the reference object. The processor 102 writes the calibration images for calibrating the projector 40 to the memory 104 for storage thereat.

With continued reference to FIG. 3, in the pre-calibration phase, the method 200 continues with determining discrete calibrated geometric parameters of the DFP system using the calibration images captured with a plurality of discrete focal length settings (block 220). Particularly, the processor 102 determines calibrated values $A_i^c$, $D_i^c$, $R_i^c$, $T_i^c$ for the camera 20 and calibrated values $A_i^p$, $D_i^p$, $R_i^p$, $T_i^p$ for the projector 40, using the calibration images for calibrating the camera 20 and the calibration images for calibrating the projector 40, respectively. As noted above, these calibration images were captured using a plurality of discrete focal length settings $f_i^c$ and/or $\eta_i^c$ of the camera 20 and, in at least some embodiments, using a plurality of discrete focal length settings $f_i^p$ and/or $\eta_i^p$ the projector 40.

For the purposes of calibrating the camera 20, the processor 102 determines, for each focal length setting $f_i^c$ and/or $\eta_i^c$ of the camera 20, a discrete calibrated value $A_i^c$ for the intrinsic parameters of the camera 20, a discrete calibrated value $D_i^c$ for the distortion parameters of the camera 20, a discrete calibrated value $R_i^c$ for the rotation extrinsic parameters of the camera 20, and discrete calibrated values $T_i^c$ for the translation extrinsic parameters of the camera 20. The processor 102 determines each discrete calibrated value $A_i^c$, $D_i^c$, $R_i^c$, $T_i^c$ based on the calibration images of the reference object in the different poses captured with the respective focal length setting $f_i^c$ and/or $\eta_i^c$ of the camera 20.

For the purposes of calibrating the projector 40, in the case it is provided with an ETL, the processor 102 determines, for each focal length setting $f_i^p$ and/or $\eta_i^p$ of the projector 40, a discrete calibrated value $A_i^p$ for the intrinsic parameters of the camera 20, a discrete calibrated value $D_i^p$ for the distortion parameters of the projector 40, a discrete calibrated value $R_i^p$ for the rotation extrinsic parameters of the projector 40, and discrete calibrated values $T_i^p$ for the translation extrinsic parameters of the projector 40. The processor 102 determines each discrete calibrated value $A_i^p$, $D_i^p$, $R_i^p$, $T_i^p$ based on the calibration images of the reference object in the different poses captured with the respective focal length setting $f_i^p$ and/or $\eta_i^p$ of the projector 40. Alternatively, in the case that the projector 40 is simply provided with a fixed lens, the processor 102 calculates constant calibrated values $A^p$, $D^p$, $R^p$, $T^p$ based on the calibration images of the reference object in the different poses.

With continued reference to FIG. 3, in the pre-calibration phase, the method 200 continues with generating a continuous geometric parameter model for the DFP system by fitting the discrete calibrated geometric parameters onto continuous functions (block 230). Particularly, the processor 102 generates a continuous geometric parameter model for the DFP system 10 by fitting the discrete calibrated values $A_i^c$, $D_i^c$, $R_i^c$, $T_i^c$ and $A_i^p$, $D_i^p$, $R_i^p$, $T_i^p$ onto continuous functions. As discussed above, the continuous geometric parameter model for the DFP system 10 takes the form of equations (4)-(9), discussed above, which include geometric parameters $A^c(.)$, $D^c(.)$, $R^c(.)$, $T^c(.)$ and $A^p(.)$, $D^p(.)$, $R^p(.)$, $T^p(.)$ that are functions of the focal length denoted by the symbol (.). As also discussed above, when an ETL is utilized, the focal length monotonically varies with the control signal $\eta$ applied to the ETL according to equation (10). Thus, all geometric parameters in the continuous geometric parameter model can be respectively modeled as polynomial functions of $\eta$, denoted by the symbol ($\eta$).

Accordingly, the processor 102 determines a set of polynomial functions $A^c(\eta)$, $D^c(\eta)$, $R^c(\eta)$, $T^c(\eta)$ for the camera 20 in the continuous geometric parameter model for the DFP system 10. Additionally, in the case that the projector 40 is also provided with an ETL, the processor 102 determines a set of polynomial functions $A^p(\eta)$, $D^p(\eta)$, $R^p(\eta)$, $T^p(\eta)$ for the projector 40 in the continuous geometric parameter model for the DFP system 10. Otherwise, in the case that the projector 40 is simply provided with a fixed lens, the constant calibrated values $A^p$, $D_p$, $R^p$, $T^p$ are utilized for the projector 40 in the continuous geometric parameter model for the DFP system 10.

Figure 4:
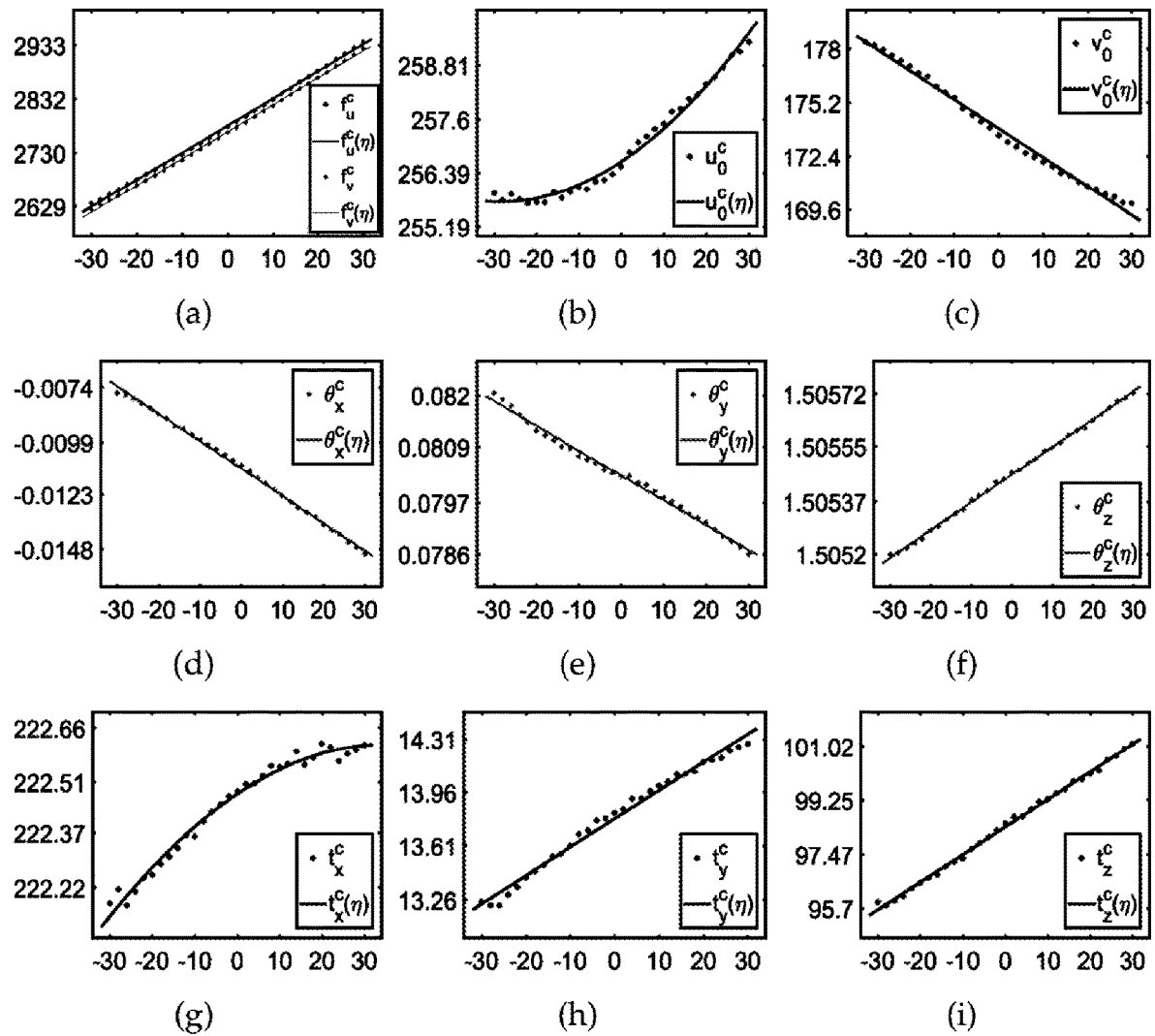
FIG. 4 shows exemplary calibrated values for the camera of the DFP system fitted to polynomial functions.

As described in equations (6) and (7), the intrinsic matrices $A^c(.)$ and $A^p(.)$ include the components $[f_u^c(.), f_v^c(.), u_0^c(.), v_0^c(.)]$ and $[f_u^p(.), f_v^p(.), u_0^p(.), v_0^p(.)]$, respectively. Accordingly, the processor 102 determines best-fit polynomial functions $f_u^c(\eta), f_v^c(\eta), u_0^c(\eta), v_0^c(\eta)$ and $f_u^p(\eta), f_v^p(\eta), u_0^p(\eta), v_0^p(\eta)$ based on the discrete calibrated values $A_i^c$ and $A_i^p$, respectively. With reference to FIG. 4, (a) shows calibrated values $A_i^c$, in particular values $f_u^c$ and $f_v^c$ thereof, fitted onto a linear functions $f_u^c(\eta)$ and $f_v^c(\eta)$. With continued reference to FIG. 4, (b) and (c) show calibrated values $A_i^c$, in particular values $u_0^c$ and $v_0^c$ thereof, fitted onto a quadratic function $u_0^c(\eta)$ and a linear function $v_0^c(\eta)$, respectively.

Additionally, as discussed above, the rotation extrinsic matrices $R^c(.)$ and $R^p(.)$ can be represented as three rotation angle components $[\theta_x^c(.), \theta_y^c(.), \theta_z^c(.)]$ and $[\theta_x^p(.), \theta_y^p(.), \theta_z^p(.)]$, respectively. Accordingly, the processor 102 determines best-fit polynomial functions $\theta_x^c(\eta), \theta_y^c(\eta), \theta_z^c(\eta)$ and $\theta_x^p(\eta), \theta_y^p(\eta), \theta_z^p(\eta)$ based on the discrete calibrated values $R_i^c$, and $R_i^p$, respectively. With reference to FIG. 4, (d), (e), and (f) show calibrated values $R_i^c$, in particular values $\theta x^c$, $\theta_y^c$, and $\theta_z^c$ thereof, fitted onto linear functions $\theta_x^c(\eta)$, $\theta_y^c(\eta)$, and $\theta_z^c(\eta)$, respectively.

Likewise, as discussed above, the translation extrinsic matrices and $T^c(.)$ and $T^p(.)$ can generally be converted to or represented as three translation distances along three axes $[t_x^c(.), t_y^c(.), t_z^c(.)]$ and $[t_x^p(.), t_y^p(.), t_z^p(.)]$, respectively. Accordingly, the processor 102 determines best-fit polynomial functions $t_x^c(\eta), t_y^c(\eta), t_z^c(\eta)$ and $t_x^p(\eta), t_y^p(\eta), t_z^p(\eta)$ based on the discrete calibrated values $T_i^c$, and $T_i^p$, respectively. With reference to FIG. 4, (g), (h), and (i) show calibrated values $T_i^c$, in particular values $t_x^c$, $t_y^c$, and $t_z^c$ thereof, fitted onto a quadratic function $t_x^c(\eta)$ and linear functions $t_y^c(\eta)$, and $t_z^c(\eta)$, respectively.

Finally, as discussed above, the distortion vectors $D^c(.)$ and $D^p(.)$ include the components $[k_1^c(.), k_2^c(.), p_1^c(.), p_2^c(.)]$ and $[k_1^p(.), k_2^p(.), p_1^p(.), p_2^p(.)]$, respectively. Accordingly, the processor 102 determines best-fit polynomial functions $k_1^c(\eta), k_2^c(\eta), p_1^c(\eta), p_2^c(\eta)$ and $k_1^p(\eta), k_2^p(\eta), p_1^p(\eta), p_2^p(\eta)$ based on the discrete calibrated values $D_i^c$ and $D_i^p$, respectively (not shown in FIG. 4).

Returning to FIG. 3, in the 3D autofocusing phase, the method 200 continues with determining a set of focal length settings that will provide in-focus coverage of one or more objects in a scene (block 240). Particularly, the processor 102 operates the camera 20 to determine one or more optimal focal length settings $f_i^c(\eta)$ for the camera 20 that one or more objects 60 into focus using a 2D autofocusing technique. In some embodiments, particularly in the case that the projector 40 is also provided with an ETL, the processor 102 determines a corresponding optimal focal length settings $f_i^p(\eta)$ for the projector 40 based on each optimal focal length setting $f_j^c(\eta)$ of the camera 20.

In at least one embodiment, the processor 102 operates the camera 20 using the passive autofocusing technique discussed above. Particularly, the processor 102 operate the camera 20 capture a plurality of images, referred to herein as an image stack I, of a scene including one or more objects 60. Each respective image $I_i$ in the image stack is captured with a different respective test focal length setting $\eta(i)$ (i.e. with different focus length $f_i$ and/or control signal $\eta_i$), where i is the index for the respective test focal length setting and/or for the respective image $I_i$ in the image stack I.

Next, the processor 102 determines a focal position map $\eta_c^*$ based on the images $I_i$ of the image stack I (which may also be referred to herein as an "focal length setting map"). Particularly, for each image $I_i$ of the image stack I, the processor 102 evaluates the image gradient $G_i$ for each pixel (u, v) using to equation (11). Then, for each pixel (u, v), the processor 102 sets a focal position $\eta_c^*(u, v)$ to be the test focal length setting $\eta(i)$ that yielded the maximum image gradient value $G_i(u, v)$ according to equation (12). Thus, each focal position $\eta_c^*(u, v)$ in the focal position map $\eta_c^*$ indicates the test focal length setting $\eta(i)$ that resulted in the pixel (u, v) being most in-focus.

Next, the processor 102 identifies a set of optimal focal length settings $f_j^c(\eta)$ that provide in-focus coverage of the entire scene and/or of the one or more objects in the scene using an image segmentation process, where j is an index of the focal length setting in the set of optimal focal length settings $f_j^c(\eta)$. Depending on how many different test focal length settings $\eta(i)$ were utilized to capture the image stack I, the pixels in the focal position map $\eta_c^*$ corresponding to a particular object in the scene will have only a limited number of focal position values $\eta_c^*(u, v)$. Likewise, an entire scene may predominantly have only a limited number of focal position values $\eta_c^*(u, v)$.

In some embodiments, the processor 102 identifies the set of optimal focal length settings $f_j^c(\eta)$ as all of the test focal length settings $\eta(i)$ that appear in the focal position map $\eta_c^*$, which is generally a subset of all of the test focal length settings $\eta(i)$ used to capture the image stack I. Alternatively, in some embodiments, the processor 102 identifies the set of optimal focal length settings $f_j^c(\eta)$ as only the most dominant test focal length settings $\eta(i)$ in the focal position map $\eta_c^*$. For example, the subset of optimal focal length settings $f_i^c(\eta)$ may include only the test focal length settings $\eta(i)$ that correspond to at least a threshold number or percentage of pixels (e.g., 2%) in the focal position map $\eta_c^*$. As another example, the set of optimal focal length settings $f_j^c(\eta)$ may include a number of test focal length settings $\eta(i)$ the provide in-focus coverage of at least a threshold percentage of the pixels in the scene (e.g., 98%). It should be appreciated that a wide variety of additional strategies (e.g., course-to-fine search) can be utilized to identify the set of optimal focal length settings $f_j^c(\eta)$ that provide sufficient in-focus coverage of the entire scene and/or of the one or more objects 60 in the scene.

Each respective focal length setting in the set of optimal focal length settings $f_j^c(\eta)$ for the camera 20 corresponds to a respective focal plane in the world space for one or more objects 60 in the scene. In the case that the projector 40 is provided with an ETL, the processor 102 further determines a corresponding set of optimal focal length settings $f_j^p(\eta)$ for the projector 40 using the continuous geometric parameter model based on the focal planes corresponding to the set of optimal focal length settings $f_j^c(\eta)$ for the camera 20.

Thus, the processor 102 determines a set of focal length setting pairs $f_j^c(\eta)$, $f_j^p(\eta)$ that will be used to capture images of the scene for 3D profilometry. Each respective focal length setting pair $f_j^c(\eta)$, $f_j^p(\eta)$ corresponds a particular group of pixels, denoted (u, v)ʲ, that are in-focus when captured using the respective focal length setting pair $f_j^c(\eta)$, $f_j^p(\eta)$.

With continued reference to FIG. 3, in the 3D autofocusing phase, the method 200 continues with determining geometric parameters of a focal plane for each autofocused image (block 250). Particularly, once the set of focal length setting pairs $f_j^c(\eta)$, $f_j^p(\eta)$ are identified, the processor 102 determines respective geometric parameters $A_j^c$, $D_j^c$, $R_j^c$, $T_j^c$ and $A_j^p$, $D_j^p$, $R_j^p$, $T_j^p$ for each pair of $f_j^c(\eta)$, $f_j^p(\eta)$ using the on the polynomial functions $A^c(\eta)$, $D^c(\eta)$, $R^c(\eta)$, $T^c(\eta)$ and $A^p(\eta)$, $D^p(\eta)$, $R^p(\eta)$, $T^p(\eta)$ of in the continuous geometric parameter model for the DFP system 10, which were determined in the pre-calibration phase. As discussed above, the continuous geometric parameter model is a function of the focal lengths $f^c(\eta)$, $f^p(\eta)$ of the camera 20 and projector 40 or, which themselves are functions of the correspond control signals $\eta$ of the camera 20 and the projector 40. Accordingly, for each for each pair of optimal focal length settings $f_j^c(\eta)$, $f_j^p(\eta)$, the processor 102 determines the values for the respective geometric parameters $A_j^c$, $D_j^c$, $R_j^c$, $T_j^c$ and $A_j^p$, $D_j^p$, $R_j^p$, $T_j^p$ in the geometric model by plugging the respective pair of optimal focal length settings $f_j^c(\eta)$, $f_j^p(\eta)$ into the continuous geometric parameter model.

With continued reference to FIG. 3, in the 3D autofocusing phase, the method 200 continues with reconstructing the 3D profile of the objects using DFP and based on the calculated geometric parameters (block 260). Particularly, it should be appreciated that, at this stage, several pairs of optimal focal length settings $f_j^c(\eta)$, $f_j^p(\eta)$ have been selected, each of is associated with a particular group of pixels (u, v)ʲ in images captured by the camera 20 and each having a corresponding set of calibrated geometric parameters $A_j^c$, $D_j^c$, $R_j^c$, $T_j^c$ and $A_j^p$, $D_j^p$, $R_j^p$, $T_j^p$. Thus, the processor 102 operates the DFP system 10 to perform 3D profile measurement (i.e., 3D profilometry) with respect to each group of pixels (u, v)ʲ separately according to a separate DFP process in which in-focus images are captured using the respective focal length settings $f_j^c(\eta)$, $f_j^p(\eta)$. It will be appreciated that a wide variety of DFP techniques can be applied to determine the 3D profile for each group of pixels (u, v)ʲ.

The processor 102 operates the projector 40 to project structured light onto the object(s) 60 within the scene to generate fringe patterns on a surface of the object(s) 60. As discussed above, the structured light can be configured so as to generate a variety of different fringe patterns including, sinusoidal fringe patterns, triangular fringe patterns, and various coded fringe patterns.

For each pair of optimal focal length settings $f_j^c(\eta)$, $f_j^p(\eta)$, the processor 102 operates the ETL of the camera 20 with control signal for the focal length setting OW and ETL of the projector 40 with control signal for the focal length setting $f_j^c(\eta)$. With the ETLs adjusted as such, for each pair of optimal focal length settings $f_j^c(\eta)$, $f_j^p(\eta)$, the processor 102 operates the camera 20 to capture one or more images, which include the fringe patterns on the surface of the object(s) 60 and which are in-focus, at least with respect to the corresponding group of pixels (u, v)ʲ.

Finally, the processor 102 is configured to execute the digital fringe projection measurement program 112 to, for each group of pixels (u, v)ʲ, determine a respective portion of a three-dimensional profile of the object(s) 60 based on the fringe patterns in the one or more images captured using the corresponding focal length settings $f_j^c(\eta)$, $f_j^p(\eta)$. As noted above, a wide variety of algorithms may be used to extract the 3D profile of the surface of the target object including, but not limited, to the three-step phase shifting algorithm using sinusoidal fringe patterns that was discussed above.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for measuring a three-dimensional profile of at least one object using the digital fringe projection system including a camera and a projector, the method comprising:
   determining, with a processor, an optimal value for a focal length setting of the camera for capturing in-focus images of the at least one object with the camera, the camera having an electrically tunable lens;
   determining, with the processor, calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model;
   projecting, with the projector, structured light onto the at least one object to generate fringe patterns on a surface of the at least one object;
   capturing, with the camera operated with the optimal value for the focal length setting of the camera, a first image of the surface of the at least one object that includes the fringe patterns on the surface of the at least one object; and
   determining, with the processor, a three-dimensional profile of the surface of the at least one object based on (i) the fringe patterns captured in the first image and (ii) the calibrated values for the plurality of geometric parameters.

2. The method according to claim 1, the determining the optimal value for the focal length setting of the camera further comprising:
   determining, with the processor, a plurality of optimal values for the focal length setting of the camera for capturing in-focus images of the at least one object with the camera.

3. The method according to claim 2, the capturing the first image of the surface of the at least one object further comprising:
   for each respective optimal value in the plurality of optimal values for the focal length setting of the camera, capturing, with the camera operated with the respective optimal value for the focal length setting of the camera, a respective first image of the surface of the at least one object that includes the fringe patterns on the surface of the at least one object.

4. The method according to claim 3, the determining the calibrated values for the plurality of geometric parameters of the digital fringe projection system further comprising:
   for each respective optimal value in the plurality of optimal values for the focal length setting of the camera, determining, with the processor, respective calibrated values for the plurality of geometric parameters of the digital fringe projection system based on (i) the geometric model of the digital fringe projection system and (ii) the respective optimal value for the focal length setting of the camera.

5. The method according to claim 4, the determining the three-dimensional profile of the surface of the at least one object further comprising:
   for each respective optimal value in the plurality of optimal values for the focal length setting of the camera, determining, with the processor, a respective portion of the three-dimensional profile of the surface of the at least one object based on (i) the fringe patterns captured in the respective first image captured using the respective optimal value for the focal length setting of the camera and (ii) the corresponding respective calibrated values for the plurality of geometric parameters.

6. The method according to claim 2, the determining the plurality of optimal values for the focal length setting of the camera further comprising:
   capturing, with the camera, a plurality of second images of the surface of the at least one object before the projecting of the structured light onto the at least one object, each image in the plurality of second images being captured with a different one of a plurality of test values for the focal length setting of the camera; and
   determining, with the processor, the plurality of optimal values for the focal length setting of the camera as a subset of the plurality of test values for the focal length setting of the camera based on the plurality of second images.

7. The method according to claim 6, the determining the plurality of optimal values for the focal length setting of the camera further comprising:
   determining, with the processor, a focal length setting map, the focal length setting map being a two-dimensional array having values corresponding to individual pixel coordinates within the plurality of second images, each value of the focal length setting map indicating a focal length setting selected from the plurality of test values for the focal length setting of the camera that makes pixels at the corresponding pixel coordinate most in-focus.

8. The method according to claim 7, the determining the focal length setting map further comprising:
   for each respective pixel coordinate within the plurality of second images, determining the focal length setting selected from the plurality of test values for the focal length setting of the camera that makes pixels at the respective pixel coordinate most in-focus by evaluating a magnitude of an image gradient at the respective pixel coordinate of each image in the plurality of second images.

9. The method according to claim 7, the determining the plurality of optimal values for the focal length setting of the camera further comprising:
   determining, with the processor, the plurality of optimal values for the focal length setting of the camera as the subset of the plurality of test values for the focal length setting of the camera that appear in the focal length setting map.

10. The method according to claim 7, the determining the three-dimensional profile of the surface of the at least one object further comprising:
for each respective optimal value in the plurality of optimal values for the focal length setting of the camera, determining, with the processor, a respective portion of the three-dimensional profile of the surface of the at least one object, the respective portion corresponding to pixels at pixel coordinate in the focal length setting map indicating the respective optimal value for the focal length setting of the camera.

11. The method according to claim 1 further comprising:
determining, with the processor, an optimal value for a focal length setting of the projector based on the optimal value for the focal length setting of the camera, the projector having an electrically tunable lens.

12. The method according to claim 1 further comprising:
determining, with the processor, the geometric model of the digital fringe projection system including a respective continuous function for each respective geometric parameter in the plurality of geometric parameters, each respective continuous function being a function of the focal length setting of the camera.

13. The method according to claim 12, the determining the geometric model of the digital fringe projection system further comprising:
capturing, with the camera, a plurality of third images of a reference object using a plurality of test values for the focal length setting of the camera; and
determining, with the processor, the respective continuous function for each respective geometric parameter in the plurality of geometric parameters based on the plurality of third images.

14. The method according to claim 13, wherein for each respective test value in the plurality of test values, the plurality of third images includes images captured using the respective test value for the focal length setting of the camera with the reference object in each of a plurality of different poses.

15. The method according to claim 14, the determining the respective continuous function for each respective geometric parameter in the plurality of geometric parameters further comprising:
determining, with the processor, a respective plurality of discrete calibrated values for the respective geometric parameter corresponding to each of the plurality of test values for the focal length setting of the camera.

16. The method according to claim 15, the determining the respective continuous function for each respective geometric parameter in the plurality of geometric parameters further comprising:
determining, with the processor, the respective continuous function by mapping the respective plurality of discrete calibrated values for the respective geometric parameter onto a respective best-fit continuous function.

17. The method according to claim 16, wherein the respective best-fit continuous function is a polynomial function.

18. The method according to claim 1, wherein the plurality of geometric parameters of the digital fringe projection system include at least one of (i) a rotation extrinsic matrix describing a rotation between a coordinate system of the camera and a world coordinate system, (ii) a translation extrinsic matrix describing a translation between a coordinate system of the camera and the world coordinate system, (iii) an intrinsic matrix of the camera, and (iv) a distortion vector describing a distortion of the electrically tunable lens of the camera.

19. A digital fringe projection system for measuring a three-dimensional profile of at least one object, the digital fringe projection system comprising:
a projector configured to project structured light onto the at least one object to generate fringe patterns on a surface of the at least one object;
a camera configured to capture images of the surface of the at least one object, the camera having an electrically tunable lens; and
a processor operably connected to the projector and the camera, the processor configured to:
determine an optimal value for a focal length setting of the camera for capturing in-focus images of the at least one object with the camera;
determine calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model;
operate the projector to project structured light onto the at least one object to generate the fringe patterns on the surface of the at least one object;
operate the camera, with the optimal value for the focal length setting of the camera, to capture a first image of the surface of the at least one object that includes the fringe patterns on the surface of the at least one object; and
determine a three-dimensional profile of the surface of the at least one object based on (i) the fringe patterns captured in the first image and (ii) the calibrated values for the plurality of geometric parameters.

20. A non-transitory computer-readable medium for measuring a three-dimensional profile of at least one object using the digital fringe projection system including a camera and a projector, the computer-readable medium storing program instructions that, when executed by a processor, cause the processor to:
determine an optimal value for a focal length setting of the camera for capturing in-focus images of the at least one object with the camera, the camera having an electrically tunable lens;
determine calibrated values for a plurality of geometric parameters of the digital fringe projection system based on (i) a geometric model of the digital fringe projection system and (ii) the optimal value for the focal length setting of the camera, the plurality of geometric parameters being continuous functions of the focal length setting of the camera in the geometric model;
operate the projector to project structured light onto the at least one object to generate fringe patterns on a surface of the at least one object;
operate the camera, with the optimal value for the focal length setting of the camera, to capture a first image of the surface of the at least one object that includes the fringe patterns on the surface of the at least one object; and
determine a three-dimensional profile of the surface of the at least one object based on (i) the fringe patterns captured in the first image and (ii) the calibrated values for the plurality of geometric parameters.

\* \* \* \* \*